(12) United States Patent
Kim et al.

(10) Patent No.: US 9,203,595 B2
(45) Date of Patent: Dec. 1, 2015

(54) EFFICIENT INITIAL ACCESS SYSTEM UNDER A MULTI-CARRIER COMBINATION CONDITION FOR SUPPORTING BROADBAND

(75) Inventors: So Yeon Kim, Anyang-si (KR); Jae Hoon Chung, Anyang-si (KR); Yeong Hyeon Kwon, Anyang-si (KR); Seung Hee Han, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 224 days.

(21) Appl. No.: 13/125,505

(22) PCT Filed: Oct. 22, 2009

(86) PCT No.: PCT/KR2009/006125
§ 371 (c)(1),
(2), (4) Date: Jul. 25, 2011

(87) PCT Pub. No.: WO2010/047545
PCT Pub. Date: Apr. 29, 2010

(65) Prior Publication Data
US 2011/0286411 A1 Nov. 24, 2011

Related U.S. Application Data

(60) Provisional application No. 61/107,655, filed on Oct. 22, 2008, provisional application No. 61/109,477, filed on Oct. 29, 2008, provisional application No. 61/109,897, filed on Oct. 30, 2008, provisional
(Continued)

(51) Int. Cl.
*H04L 5/00* (2006.01)
*H04W 74/08* (2009.01)

(52) U.S. Cl.
CPC ............ *H04L 5/0098* (2013.01); *H04L 5/0007* (2013.01); *H04L 5/0092* (2013.01); *H04L 5/0096* (2013.01); *H04W 74/08* (2013.01)

(58) Field of Classification Search
CPC ... H04L 5/0007; H04L 5/0098; H04L 5/0091; H04L 5/0092; H04L 5/0094; H04L 5/0096
See application file for complete search history.

(56) References Cited

U.S. PATENT DOCUMENTS

2004/0029579 A1   2/2004   Kashiwase
2008/0112383 A1   5/2008   Li
(Continued)

FOREIGN PATENT DOCUMENTS

KR    10-0588727 B1      6/2006
KR    10-2008-0021159 A  3/2008
WO    WO 2007/091795  *  8/2007

OTHER PUBLICATIONS

NTT Docomo, "Initial Access Procedure for Asymmetric Wider Bandwidth in LTE-Advanced", Sep. 2008.*
(Continued)

*Primary Examiner* — Omer S Mian
(74) *Attorney, Agent, or Firm* — Birch, Stewart, Kolasch & Birch, LLP

(57) ABSTRACT

The present invention relates to a wireless access system, and more particularly, to an initial system under a multi-carrier combination condition. A method of for performing an initial access in a base station which supports the multi-band of a terminal according to one embodiment of the present invention comprises the steps of: searching one or more downlink component carriers of the base station; receiving system information including a broadcast channel of a first downlink component carrier from among the searched one or more downlink component carriers and information for indicating one or more uplink component carriers connected to the first downlink component carrier; transmitting a first message to the base station through a first uplink component carrier from among one or more uplink component carriers indicated by the received system information; and receiving a second message including uplink authorization information from the base station through the first downlink component carrier.

8 Claims, 15 Drawing Sheets

Related U.S. Application Data application No. 61/142,220, filed on Jan. 2, 2009, provisional application No. 61/172,205, filed on Apr. 23, 2009, provisional application No. 61/241,365, filed on Sep. 10, 2009, provisional application No. 61/246,542, filed on Sep. 29, 2009.

(56) References Cited

U.S. PATENT DOCUMENTS

| | | |
|---|---|---|
| 2008/0159248 A1 | 7/2008 | Li |
| 2008/0188260 A1* | 8/2008 | Xiao et al. .................. 455/522 |
| 2008/0259863 A1 | 10/2008 | Zhang et al. |
| 2008/0287068 A1 | 11/2008 | Etemad |
| 2009/0028103 A1 | 1/2009 | Wang et al. |
| 2010/0157927 A1 | 6/2010 | Mochizuki et al. |
| 2010/0238872 A1* | 9/2010 | Kim et al. .................. 370/329 |
| 2011/0098035 A1* | 4/2011 | Frenger et al. .............. 455/423 |
| 2011/0158104 A1* | 6/2011 | Frenger et al. .............. 370/241 |
| 2011/0310795 A1* | 12/2011 | Andersson et al. .......... 370/328 |

OTHER PUBLICATIONS

Huawei, "DL/UL Asymmetric Carrier aggregation", Sep. 2008.*

* cited by examiner (a)

(b)

(a)

(b)

(a)

(b)

EFFICIENT INITIAL ACCESS SYSTEM UNDER A MULTI-CARRIER COMBINATION CONDITION FOR SUPPORTING BROADBAND

This application is a National Phase of PCT/KR2009/006125 filed on Oct. 22, 2009, which claims priority under 35 USC 119(e) to U.S. Provisional Application Nos. 61/107,655, 61/109,477, 61/109,897, 61/142,220, 61/172,205, 61/241,365 and 61/246,542 filed on Oct. 22, 2008, Oct. 29, 2008, Oct. 30, 2008, Jan. 2, 2009, Apr. 23, 2009, Sep. 10, 2009 and Sep. 29, 2009, respectively. All of which are hereby expressly incorporated by reference into the present application.

TECHNICAL FIELD

The present invention relates to a radio access system, and more particularly, to in an initial access method in a multi-carrier aggregation environment.

BACKGROUND ART

Hereinafter, a carrier will be briefly described.

A user may perform a modulation operation with respect to the amplitude, frequency and/or phase of a sine wave and a periodic pulse wave. A sine wave or a pulse wave for carrying information is called a carrier.

Examples of a carrier modulation scheme include a Single-Carrier Modulation (SCM) scheme and a Multi-Carrier Modulation (MCM) scheme. Among others, the SCM scheme involves performing modulation with respect to all information carried on one carrier.

The MCM scheme refers to a technology of dividing an overall bandwidth channel of one carrier into several sub-channels each having a small bandwidth and transmitting a plurality of narrowband sub-carriers through the sub-channels.

In the MCM scheme, each of the sub-channels is approximated to a flat channel due to the limited bandwidth.

A user can compensate for channel distortion using a simple equalizer. In addition, the MCM scheme is implemented at a high speed using Fast Fourier Transform (FFT) and is more advantageous in high-speed data transmission than the SCM scheme.

As capabilities of a base station and/or a terminal have been developed, an available frequency bandwidth of the base station and/or the terminal has been expanded. Accordingly, in the embodiments of the present invention, a multi-carrier system supporting a wideband by aggregating one or more carriers is disclosed.

That is, in the following multi-carrier system, one or more carriers are aggregated and used, unlike the MCM scheme of dividing one carrier into sub-carriers and utilizing the sub-carriers.

In order to efficiently utilize multiple bands or multiple carriers, a technique of managing several carriers (e.g., several frequency carriers (FC)) by one medium access control (MAC) entity has been proposed.

FIGS. 1(a) and 1(b) are diagrams illustrating a method of transmitting or receiving a signal based on a multi-band radio frequency (RF).

In FIG. 1, in a transmitter and a receiver, one MAC layer may manage several carriers in order to efficiently use multiple carriers. In order to efficiently transmit or receiver multiple carriers, it is assumed that both the transmitter and the receiver can transmit or receive multiple carriers. Since the FCs managed by one MAC layer do not need to be contiguous with each other, flexible resource management is possible. That is, both contiguous aggregation and non-contiguous aggregation are possible.

In FIGS. 1(a) and 1(b), a physical layer (PHY) 0, a physical layer 1, ..., a physical layer n-2 and a physical layer n-1 represent multiple bands of the present technique and each band may have an FC size assigned for a specific service according to a predetermined frequency policy. For example, the physical layer 0 (RF carrier 0) may have a frequency band size assigned for a general FM radio broadcast and the physical layer 1 (RF carrier 1) may have a frequency band size assigned for mobile telephone communication.

The frequency bands may have different frequency band sizes according to frequency band characteristics. However, in the following description, for convenience of description, it is assumed that each FC has a size of A [MHz]. Each frequency assignment band may be a carrier frequency for utilizing a baseband signal in each frequency band. Hereinafter, each frequency assignment band is referred to as "carrier frequency band" or simply "carrier" representative of each carrier frequency band if such use will not lead to confusion. Recently, as in the 3GPP LTE-A, the above carrier may be referred to as a "component carrier" in order to be distinguished from a subcarrier used in an MCM scheme.

Therefore, the above "multi-band" scheme may be referred to as a "multi-carrier" scheme or a "carrier aggregation" scheme.

In order to transmit a signal through multiple bands as shown in FIG. 1(a) and receive a signal through multiple bands as shown in FIG. 1(b), the transmitter/receiver needs to include an RF module for transmitting the signal through the multiple bands. In FIG. 1, the method of configuring "MAC" is determined by a base station regardless of downlink (DL) and uplink (UL).

In brief, the present technique refers to a technique for enabling one MAC entity to manage a plurality of RF carriers so as to transmit/receive a signal. The RF carriers managed by one MAC do not need to be contiguous with each other. According to the present technique, more flexible resource management is possible.

FIG. 2 is a diagram showing an example of a method of assigning a frequency in a multi-carrier system.

In FIG. 2, frequency carriers 0 to 7 may be managed by RFs 0 to 7. In the example of FIG. 2, it is assumed that the frequency carrier 0, the frequency carrier 2, the frequency carrier 3, the frequency carrier 6 and the frequency carrier 7 are already assigned to specific communication services. Available frequency carriers 1, 4 and 5 may be efficiently managed by one MAC (MAC #5). Since the frequency carriers configuring one MAC may not contiguous with each other as described above, it is possible to more efficiently manage frequency resources.

The above-described multi-band communication scheme is only conceptually defined and, as necessary, only frequency carriers may be further assigned. Therefore, it is necessary to define a signal transmission/reception scheme capable of achieving more efficient, high-capability processing.

In the above-described multi-band communication scheme, it is necessary to define a method of selecting carriers from among a plurality of available carriers of a base station in order to perform initial access.

DISCLOSURE

Technical Problem

An object of the present invention is to provide an efficient communication system and method.

Another object of the present invention is to provide an efficient initial access method in a multi-band communication environment.

Another object of the present invention is to provide a method of efficiently notifying a user equipment (UE) of specific-UE or specific-UE-group available carrier information in a multi-band communication environment.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

Technical Solution

To achieve these objects and other advantages and in accordance with the purpose of the invention, as embodied and broadly described herein, methods of, at a user equipment (UE), performing initial access to a base station supporting multiple bands.

In one aspect of the present invention, a method of supporting initial access of a user equipment (UE) in a base station supporting multiple bands comprises searching for one or more downlink component carriers of the base station, receiving a broadcast channel of a first downlink component of the searched one or more downlink component carriers and system information including information indicating one or more uplink component carriers linked with the first downlink component carrier, transmitting a first message to the base station through a first uplink component carrier of the one or more uplink component carriers indicated by the received system information, and receiving a second message including uplink grant information from the base station through the first downlink component carrier.

The first message may include one random access preamble selected from a random access preamble set indicated by a physical random access parameter included in the broadcast channel.

The physical random access parameter may be equally set with respect to the one or more downlink component carriers. In this case, the second message may be transmitted at different timings according to the one or more downlink component carriers linked with the first uplink component carrier.

The physical random access parameter may be differently set with respect to the one or more downlink component carriers.

The method may further include receiving carrier assignment information indicating UE-specific or UE-group-specific available candidate carriers in the multiple bands supported by the base station from the base station through dedicated signaling.

The method may further include receiving carrier change information for overriding the carrier assignment information through UE-specific or UE-group-specific dedicated signaling.

In another aspect of the present invention, a method of supporting initial access of a user equipment (UE) in a base station supporting multiple bands comprises receiving a first message from the UE through a first uplink component carrier, transmitting a second message to the UE through one or more downlink component carriers linked with the first uplink component carrier in response to the first message, and transmitting carrier assignment information indicating UE-specific or UE-group-specific available candidate carriers in the multiple bands supported by the base station to the UE through dedicated signaling.

The first message may include one random access preamble selected from a random access preamble set indicated by a physical random access parameter included in a broadcast channel of the base station.

The physical random access parameter may be equally set with respect to the one or more downlink component carriers. In this case, the second message may include different temporary UE identifiers and uplink grant information according to the one or more downlink component carriers.

The second message may be transmitted to the UE at different timings according to the one or more downlink component carriers.

The physical random access parameter may be set to have different random access preamble sets according to the one or more downlink component carriers. In this case, the second message may be transmitted to the UE only through a downlink component carrier having a physical random access parameter corresponding to the random access preamble included in the first message among the one or more downlink component carriers.

The method may further include transmitting carrier change information for overriding the carrier assignment information to the UE through UE-specific or UE-group-specific dedicated signaling.

In another aspect of the present invention, a mobile terminal comprises a processor, and a radio frequency (RF) module configured to receive a RF signal from an external device, perform decoding and demodulation, transmit the decoded and demodulated signal to the processor, or perform modulation and coding with respect to data received from the processor and transmit the modulated and coded data to an external device. The processor searches for one or more downlink component carriers of a base station, receives a broadcast channel of a first downlink component of the one or more downlink component carriers and system information including information indicating one or more uplink component carriers linked with the first downlink component carrier, transmits a first message to the base station through a first uplink component carrier of the one or more uplink component carriers indicated by the received system information, and receives a second message including uplink grant information from the base station through the first downlink component carrier.

Advantageous Effects

The embodiments of the present invention have the following effects.

First, it is possible to perform efficient communication using the embodiments of the present invention.

Second, it is possible for a UE to efficiently perform initial access to a base station using an initial access method in a multi-band communication environment.

Third, it is possible for a base station to efficiently notify a UE of UE-specific or UE-group-specific available carrier information in a multi-band communication environment.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

MODE FOR INVENTION

Figure 1:
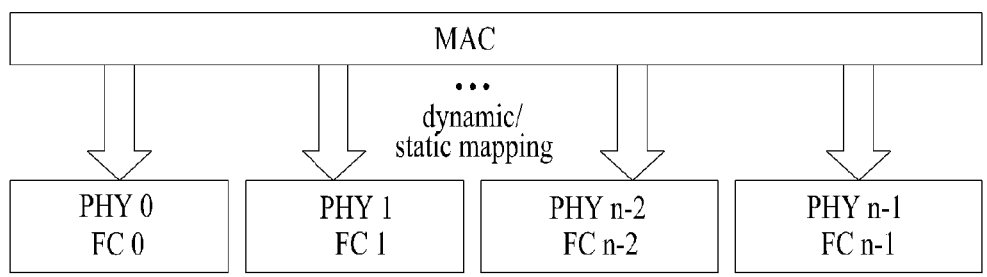
FIGS. 1(a) and 1(b) are diagrams illustrating a multi-band RF signal transmission/reception method.
Figure 1:
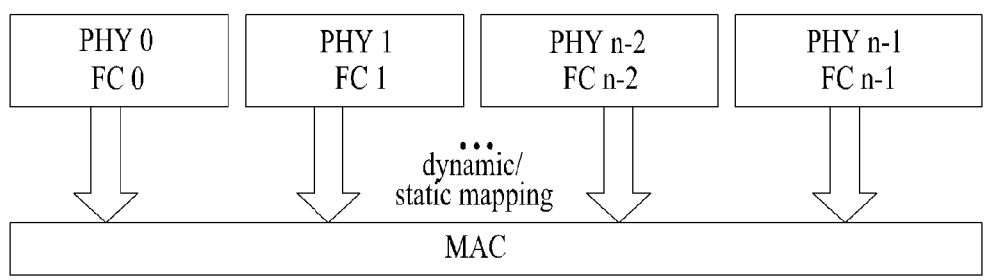
Figure 2:
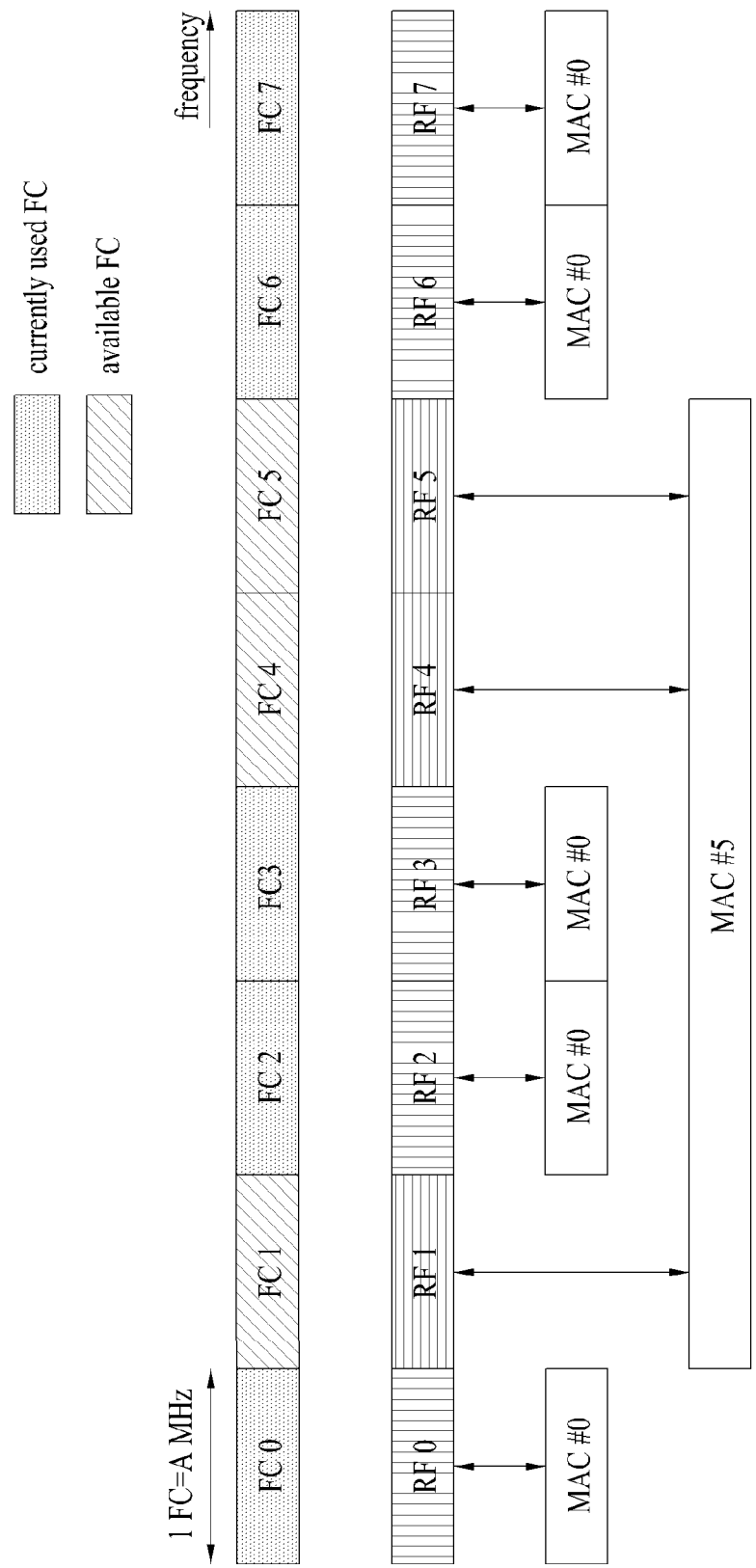
FIG. 2 is a diagram showing an example of a method of assigning a frequency in a multi-carrier system.

Hereinafter, the preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out. Hereinafter, the detailed description includes detailed matters to provide full understanding of the present invention. However, it will be apparent to those skilled in the art that the present invention can be carried out without the detailed matters. For example, the following description will be made on the assumption of a 3GPP LTE mobile communication system, but the present invention is applicable to other mobile communication systems excluding the unique matters of the 3GPP LTE system.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, it is assumed that a terminal includes a mobile or fixed user end device such as a user equipment (UE) and a mobile station (MS), and a base station includes a node of a network end communicating with a terminal, such as a Node-B, an base station, and a base station.

In the embodiments of the present invention, a medium access control (MAC) layer may be a generic term for a layer higher than a physical layer (PHY) or Layer 1 in seven layers of the Open System Interconnection (OSI). Although frequency carriers are contiguous for convenience in the drawings illustrating the embodiments of the present invention, the frequency carriers need not be physically contiguous as described above.

Figure 3:
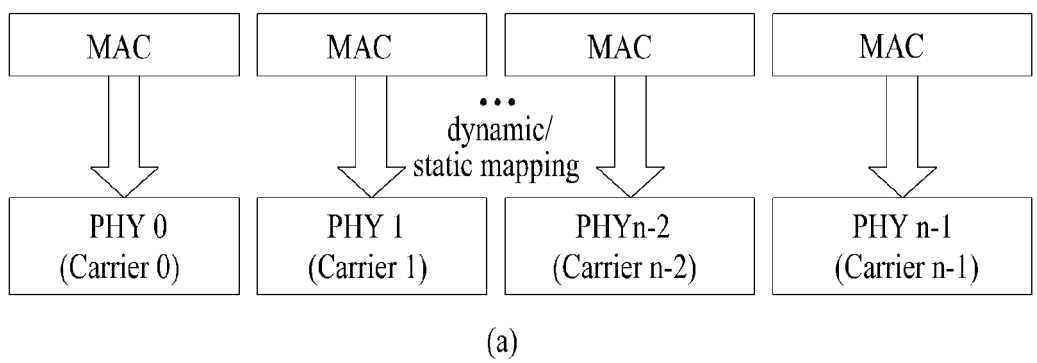
FIGS. 3(a) and 3(b) are diagrams showing an example of a method of managing several carriers using several medium access control (MAC) layers.
Figure 3:
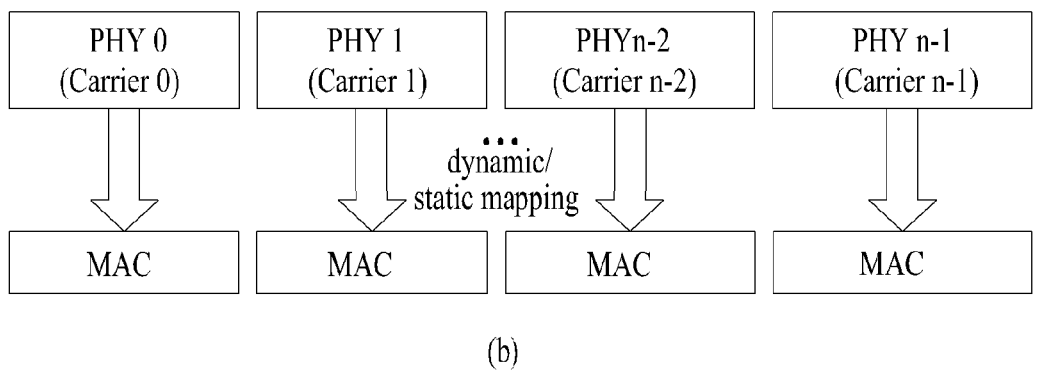

FIGS. 3(a) and 3(b) are diagrams showing an example of a method of managing several carriers by several medium access control (MAC) layers.

FIG. 3(a) shows a one-to-one mapping relationship between a MAC layer and a physical layer in the case where a transmitter (base station) supports multiple carriers. FIG. 3(b) shows a one-to-one mapping relationship between a MAC layer and a physical layer in the case where a receiver (UE) supports multiple carriers. One physical layer may use one carrier.

FIGS. 4(a) and 4(b) are diagrams showing an example of a method of managing one or more carriers by one MAC layer.

Figure 4:
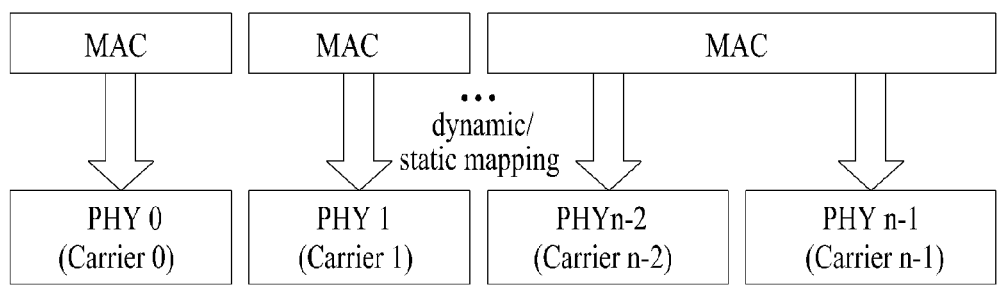
FIGS. 4(a) and 4(b) are diagrams showing an example of a method of managing one or more carriers by one MAC layer.
Figure 4:
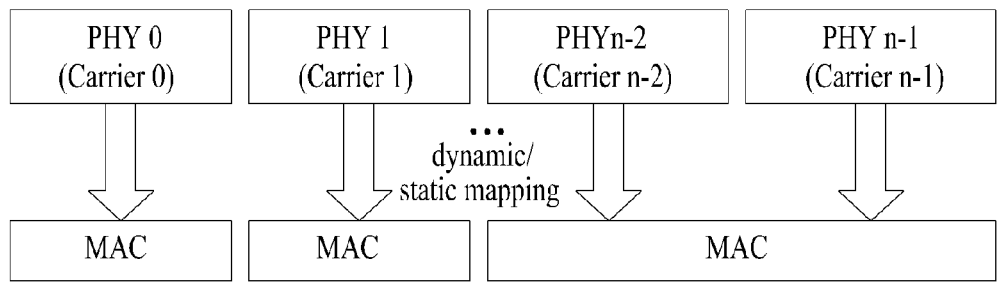

In FIG. 4, MAC layers may be respectively mapped to physical layers in specific carriers (a carrier 0 and a carrier 1) and one MAC layer may be mapped to physical layers in one or more carriers (a carrier n-2 and a carrier n-1).

Referring to FIG. 4, FIG. 4(a) shows a 1-to-1 or 1-to-m (1<m) mapping relationship between the MAC layer and the physical layer in the case where a transmitter (base station) supports multiple carriers, and FIG. 4(b) shows a 1-to-1 or 1-to-m mapping relationship between the MAC layer and the physical layer in the case where a receiver (terminal) supports multiple carriers.

In a system supporting multiple carriers, the carrier used by each terminal may vary according to capabilities of a base station and a terminal. Carrier band supporting capability of the base station may be constant. The base station and the terminal may negotiate carrier support upon call setup according to the capability of the base station.

In the embodiments of the present invention, information regarding a carrier supported by a terminal, that is, information indicating which range or RF carrier is supported by a certain UE, may be used to distinguish UE categories.

Accordingly, the base station and the UE explicitly specify a specific range or a specific carrier on a UE category or UE class basis so as to negotiate whether multiple carriers are supported on a UE class basis, whether simultaneous reception processing is supported, simultaneous reception processing or adaptive carrier selection and parallel and sequential processing division, and a carrier support range.

At this time, in a method of implicitly specifying UE category, it is possible to implicitly divide UE categories based on a 1-to-1 mapping relationship by other parameters such as a peak data rate and a reception band of a UE.

A base station may explicitly specify RF carriers supported by the base station in cell-specific radio resource control (RRC) information and transmit the information to a certain base station or UEs within a cell. For example, the base station may transmit RF carriers supported by the base station to a certain base station or UEs within the cell through a primary broadcast channel (PBCH), a cell-specific RRC signaling, a broadcast control channel (BCCH), a dedicated broadcast channel (DBCH) or SU information.

On the contrary, a UE may notify a base station of information regarding RF carriers which can be received by the UE upon accessing a certain base station or cell by including the information regarding the RF carriers in a profile or separate signaling.

A base station having a downlink scheduler and/or an uplink scheduler may semi-statically update information regarding RF carriers which will be assigned to individual UEs. Therefore, the base station may transmit the information regarding the RF carriers to individual UEs through UE-specific RRC signaling (or higher layer signaling).

For example, the base station may semi-statically transmit information regarding a candidate band which may be used by each UE according to capabilities of the base station and the UE, that is, information indicating which carrier may be used by the UE, to the UEs through RRC signaling.

In a multi-carrier system supporting multi-carrier transmission/reception, a center frequency and a carrier bandwidth may be differently set on a carrier basis. The number of frequency carriers supported by an individual base station and an individual UE for transmission/reception, the center frequency and the frequency bandwidth are differently set on a UE category (e.g., a UE level), a base station category (e.g., a base station level, a cell level, a cluster level or a network level) basis.

In the case where a base station manages multiple carriers, necessary setting information, a variety of control information according to setting and a transmission/reception method thereof may be differently applied according to a setting level of a UE category or a base station category.

A method of setting a center frequency of an IMT Advanced (IMT-A) or an LTE-A system may include the following two methods.

1. Method of locating a central frequency on multiple carriers while maintaining frequency raster of an IMT system (or an LTE system).

2. Method of independently locating a center frequency regardless of frequency raster of an IMT system.

In addition, in order to support a wider system bandwidth of an IMT-A system than a system bandwidth supported by an IMT system, two methods of setting the bandwidth of each carrier included in multiple frequency carriers may be considered. For example, a method of differently setting a multi-carrier management method, that is, the number of carriers used to support a target system bandwidth or the bandwidth of each carrier according to the target system bandwidth, may be considered.

Figure 5:
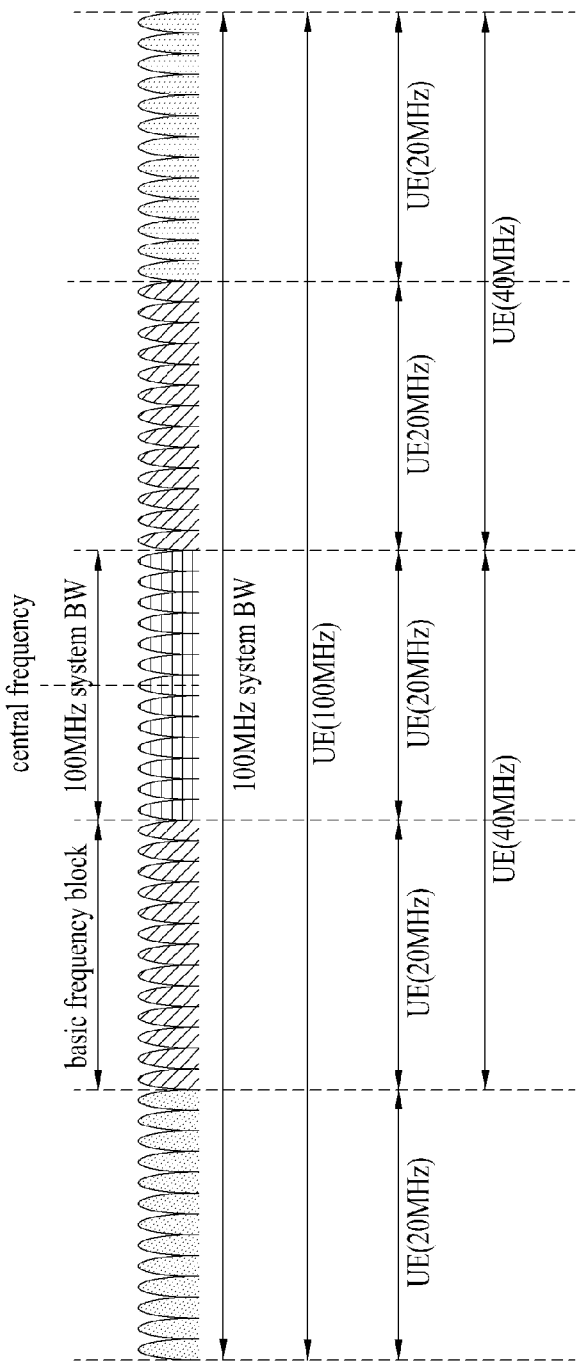
FIGS. 5 and 6 are diagrams showing one method of setting a carrier bandwidth in a multi-carrier system.
Figure 6:
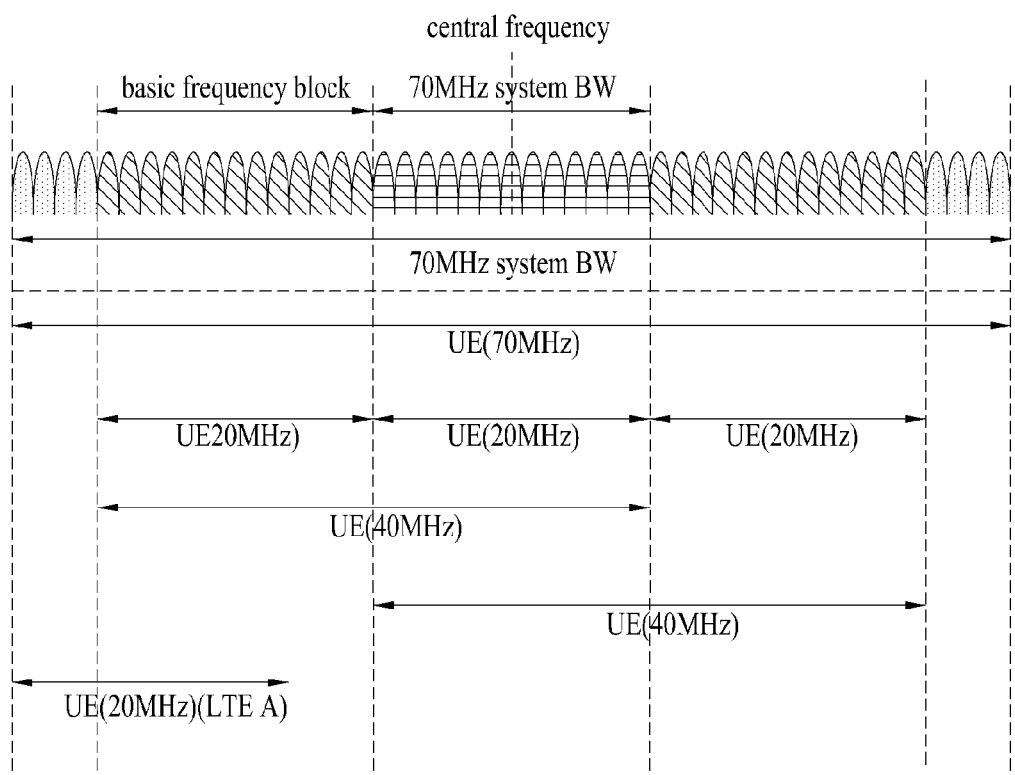

FIGS. 5 and 6 are diagrams showing one method of setting a carrier bandwidth in a multi-carrier system.

A method of setting a carrier bandwidth will now be described.

A user symmetrically assigns basic frequency blocks to both sides of a specific center frequency, in order to support a target system bandwidth. Next, frequency carriers (FCs) smaller than the basic frequency blocks may be assigned to the remaining bands smaller than A [MHz]. Even when the FCs are assigned to the bands smaller than A [MHz], the FCs necessary to assign the target system bandwidth are symmetrically assigned to both sides of the specific center frequency.

Referring to FIGS. 5 and 6, FIG. 5 shows the case where a system bandwidth is 100 MHz and a center frequency is 50 MHz and FIG. 6 shows the case where a system bandwidth is MHz and a center frequency is 35 MHz. The bandwidth supported by a terminal (e.g., UE) may be in a range from 20 MHz to 100 MHz.

Figure 7:
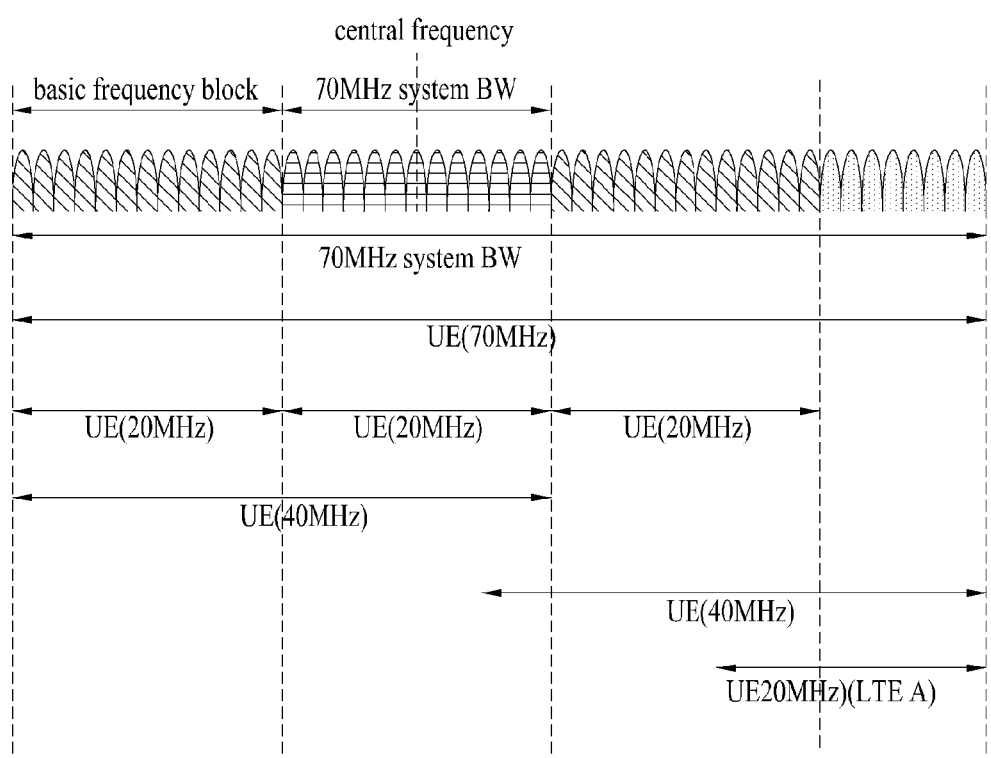
FIG. 7 is a diagram showing another method of setting a carrier bandwidth in the multi-carrier system.

FIG. 7 is a diagram showing another method of setting a carrier bandwidth in the multi-carrier system.

A user first assigns a bandwidth in basic frequency block units in order to support a target system bandwidth. Next, FCs smaller than the basic frequency block are asymmetrically assigned to the remaining bands smaller than A MHz.

Referring to FIG. 7, a center frequency is set after basic frequencies are assigned to a system bandwidth. The frequency bandwidth may be asymmetrically assigned with respect to the center frequency.

Hereinafter, fields used to efficiently transmit or receive a control channel and/or a data channel will be described in detail.

In an LTE system, UEs may not be aware of using which physical resources a control channel thereof is transmitted and in which subframe the control channel thereof is transmitted. Accordingly, the UEs may receive a control channel using a blind decoding method for decoding all control channels until the control channel thereof is found.

In a mobile communication system, a UE may receive information from a base station in downlink and transmit information to the base station in uplink. Information transmitted or received by the UE includes data and a variety of control information, and various physical channels may be used according to the kind of the information transmitted or received by the UE.

Figure 8:
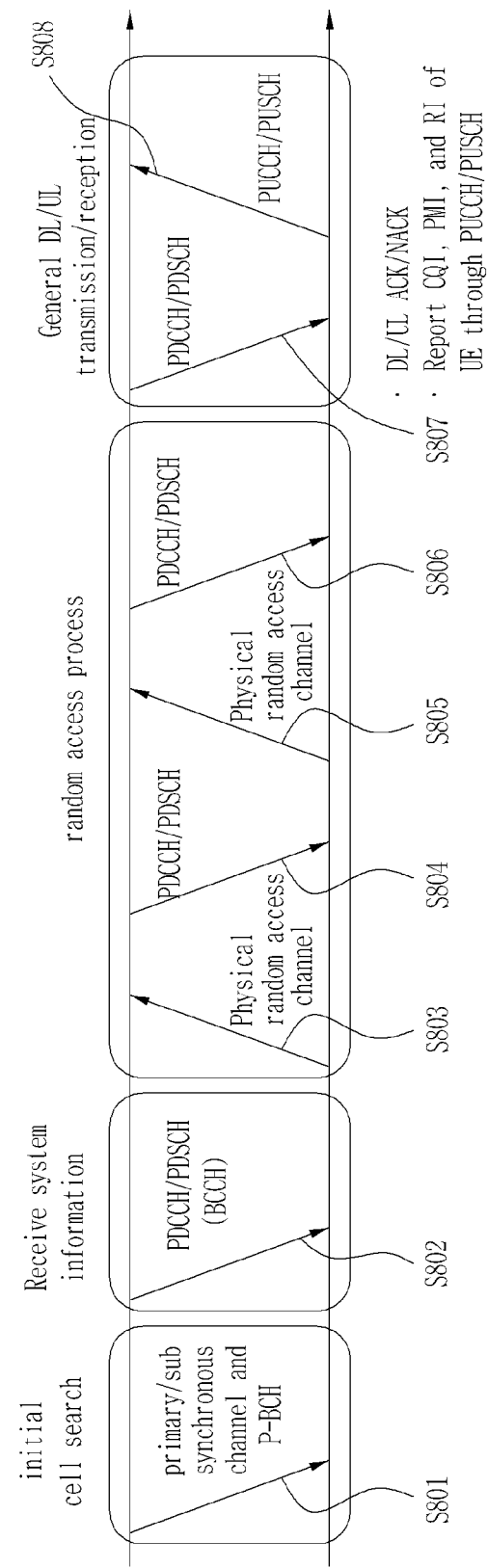
FIG. 8 is a diagram illustrating physical channels used in a $3^{rd}$ Generation Partnership Project (3GPP) Long Term Evolution (LTE) system, which is an example of a mobile communication system, and a general signal transmission method using the same.

FIG. 8 is a view showing physical channels used for a 3$^{rd}$ Generation Partnership Project (3GPP) Long Term Evolution (LTE) system, which is an example of a mobile communication system, and a general signal transmission method using the same.

When a UE is powered on or when the UE newly enters a cell, the UE performs an initial cell search operation such as synchronization with a base station in step S801. For the initial cell search operation, the UE may receive a Primary Synchronization Channel (P-SCH) and a Secondary Synchronization Channel (S-SCH) from the base station so as to perform synchronization with the base station, and acquire information such as a cell ID. Thereafter, the UE may receive a physical broadcast channel from the base station and acquire broadcast information within the cell. Meanwhile, the UE may receive a Downlink Reference signal (DL RS) in the initial cell search step and confirm a downlink channel state.

The UE which completes the initial cell search may receive a Physical Downlink Control Channel (PDCCH) and a Physical Downlink Shared Channel (PDSCH) corresponding to the PDCCH, and acquire more detailed system information in step S802.

Meanwhile, the UE which initially accesses the base station or does not have radio resources for signal transmission may perform a random access procedure with respect to the base station in steps S803 to S806. For the random access procedure, the UE may transmit a feature sequence via a Physical Random Access Channel (PRACH) as a preamble (S803), and may receive a random access response message via the PDCCH and the PDSCH corresponding thereto (S804). In contention-based random access except for handover, a contention resolution procedure including the transmission of an additional PRACH (S805) and the reception of the PDCCH and the PDSCH corresponding thereto (S806) may be performed.

The UE which performs the above-described procedure may then receive the PDCCH/PDSCH (S807) and transmit a Physical Uplink Shared Channel (PUSCH)/Physical Uplink Control Channel (PUCCH) (S808), as a general uplink/downlink signal transmission procedure. At this time, the control information transmitted from the UE to the base station or transmitted from the base station to the UE includes a downlink/uplink acknowledgement (ACK)/Negative ACK (NACK) signal, channel quality information (CQI)/precoding matrix index (PMI)/rank indicator, etc. In the 3GPP LTE system, a UE may transmit control information such as CQI/PMI/RI through a PUSCH and/or a PUCCH.

Meanwhile, a random access procedure provided by an LTE system will now be briefly described based on the above description.

First, the UE may perform a random access procedure in the following cases:
  when the UE performs initial access because there is no RRC connection with the base station,
  when the UE initially accesses a target cell in a handover procedure,
  when the random access procedure is requested by a command of the base station,
  when there is uplink data transmission in a situation where uplink time synchronization is not aligned or where specific radio resources used for requesting radio resources are not assigned, and
  when a recovery procedure is performed in case of a radio link failure or a handover failure.

In the LTE system, there are two procedures in selecting a random access preamble: one is a contention based random access procedure in which a UE randomly selects one preamble within a specific group for use, another is a non-contention based random access procedure in which a UE uses a random access preamble assigned only to a specific UE by a base station. The non-contention based random access procedure may be used, as described above, only in the handover procedure or when it is requested by the command of the base station.

Meanwhile, a procedure in which a UE performs random access to a specific base station may include steps of (1) at the UE, transmitting a random access preamble to the base station (hereinafter, referred to as a "first message (Message 1)" transmission step if such use will not lead to confusion), (2) receiving a random access response from the base station in correspondence with the transmitted random access preamble (hereinafter, referred to as a "second message (Message 2)" reception step if such use will not lead to confusion), (3) transmitting an uplink message using information received by the random access response message (hereinafter, referred to as a "third message (Message 3)" transmission step if such use will not lead to confusion), and (4) receiving a message corresponding to the uplink message from the base station (hereinafter, referred to as a "fourth message (Message 4)" reception step if such use will not lead to confusion).

Figure 9:
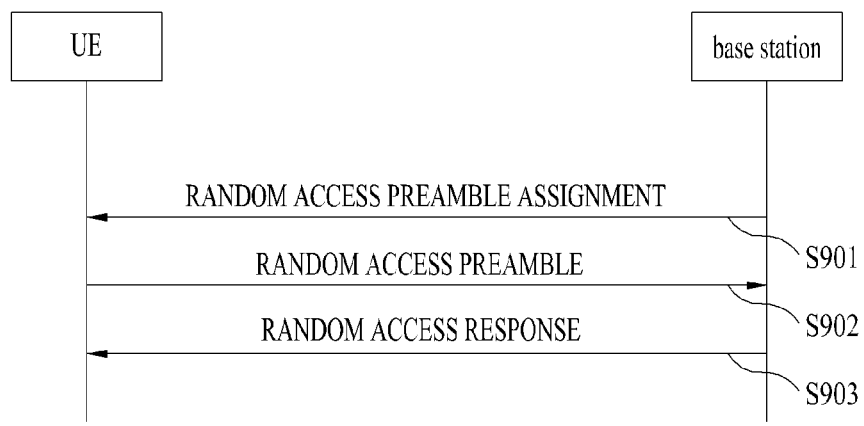
FIG. 9 is a diagram showing an operation of a UE and a base station in a non-contention based random access procedure.

FIG. 9 shows an operation procedure between a UE and a base station in a non-contention based random access procedure.

(1) Random Access Preamble Assignment

As described above, a non-contention based random access procedure may be performed (1) in a handover procedure and (2) when the random access procedure is requested by a command of a base station. Even in these cases, a contention based random access procedure may be performed.

First, it is important that a specific random access preamble without the possibility of collision is received from the base station, for the non-contention based random access procedure. Methods of receiving the random access preamble may include a method using a handover command and a method using a Physical Downlink Control Channel (PDCCH) command. Using such a method, the UE receives an assigned random access preamble (S901).

(2) Message 1 Transmission

The UE transmits the preamble to the base station after receiving the assigned random access preamble from the base station as described above (S902).

(3) Message 2 Transmission

The UE attempts to receive its random access response within a random access response reception window indicated by the base station through a handover command or system information after transmitting the random access preamble in step S902 (S903). More specifically, the random access response information may be transmitted in the form of a Medium Access Control (MAC) Packet Data Unit (PDU), and the MAC PDU may be transferred via a Physical Downlink Shared Channel (PDSCH). In addition, the UE preferably monitors the PDCCH in order to enable to the UE to properly receive the information transferred via the PDSCH. That is, the PDCCH may preferably include information about a UE that should receive the PDSCH, frequency and time information of radio resources of the PDSCH, a transfer format of the PDSCH, and the like. Here, if the PDCCH has been successfully received, the UE may appropriately receive the random access response transmitted through the PDSCH according to information of the PDCCH. The random access response may include a random access preamble identifier (e.g. Random Access-Radio Network Temporary Identifier (RA-RNTI)), an UL Grant indicating uplink radio resources, a temporary C-RNTI, a Time Advance Command (TAC), and the like.

As described above, the reason why the random access response includes the random access preamble identifier is because a single random access response may include random access response information of at least one UE and thus it is reported to which UE the UL Grant, the Temporary C-RNTI and the TAC are valid. In this step, it is assumed that the UE selects a random access preamble identifier matched to the random access preamble selected by the UE in step S902.

In the non-contention based random access procedure, it is determined that the random access procedure is normally performed, by receiving the random access response information, and the random access procedure may be finished.

Figure 10:
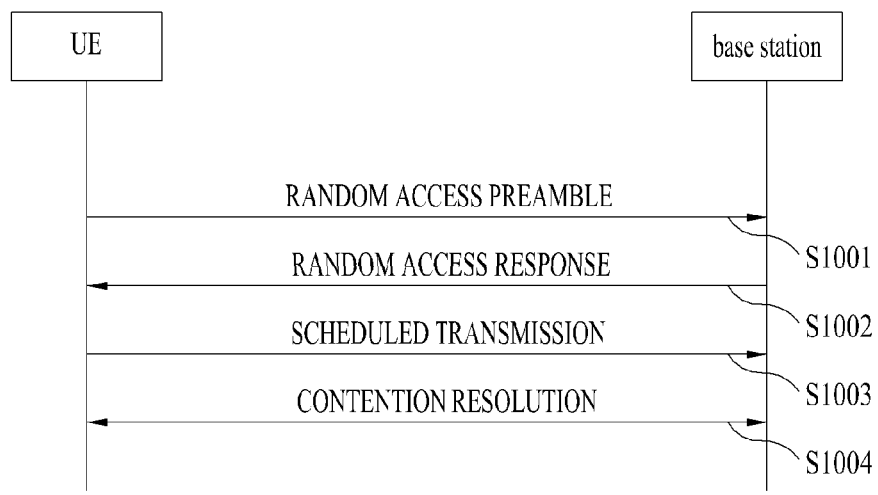
FIG. 10 is a diagram showing an operation of a UE and a base station in a contention based random access procedure.

FIG. 10 is a diagram showing an operation of a UE and a base station in a contention based random access procedure.

(1) Message 1 transmission

First, the UE may randomly select a single random access preamble from a set of random access preambles indicated through system information or a handover command, and select and transmit Physical Random Access Channel (PRACH) resources capable of transmitting the random access preamble (S1001).

(2) Message 2 reception

A method of receiving random access response information is similar to that of the above-described non-contention based random access procedure. That is, the UE attempts to receive its random access response within a random access response reception window indicated by the base station through the system information or the handover command, after the random access preamble is transmitted in step S901, and receives a Physical Downlink Shared Channel (PDSCH) using random access identifier information corresponding thereto (S1002). Accordingly, the UE may receive a UL Grant, a Temporary C-RNTI, a TAC and the like.

(3) Message 3 transmission

If the UE has received the random access response valid to the UE itself, the UE may process each of the information included in the random access response. That is, the UE applies the TAC, and stores the temporary C-RNTI. In addition, the UE uses the received UL Grant so as to transmit data (that is, Message 3) to the base station (Step S1003). Message 3 should include the identifier of the UE. This is because, in the contention based random access procedure, the base station may not determine which UEs are performing the random access procedure, but later the UEs should be identified for contention resolution.

Here, two different schemes may be provided to include the UE identifier. A first scheme is to transmit the UE's cell identifier through an uplink transmission signal corresponding to the UL Grant if the UE has already received a valid cell identifier assigned in a corresponding cell prior to the random access procedure. Conversely, the second scheme is to transmit the UE's unique identifier (e.g., S-TMSI or random ID) if the UE has not received a valid cell identifier prior to the random access procedure. In general, the unique identifier is longer than the cell identifier. If the UE has transmitted data corresponding to the UL Grant, the UE starts a Contention Resolution (CR) timer.

(4) Fourth message (Message 4) reception

After the UE transmits the data with its identifier through the UL Grant included in the random access response, the UE waits for an indication (instruction) of the base station for contention resolution. That is, the UE attempts to receive the PDCCH in order to receive a specific message (Step 1004). Here, there are two schemes to receive the PDCCH. As described above, if the UE identifier included in Message 3 transmitted in correspondence with the UL Grant is the cell identifier, the UE attempts to receive the PDCCH by using its cell identifier. If the UE identifier included in Message 3 transmitted in correspondence with the UL Grant is its unique identifier, the UE attempts to receive the PDCCH by using the temporary C-RNTI included in the random access response. Thereafter, in the former case, if the PDCCH is received through its cell identifier before the contention resolution timer expires, the UE determines that the random access procedure has been normally performed, thus completing the random access procedure. In the latter case, if the PDCCH is received through the temporary C-RNTI before the contention resolution timer expires, the UE checks data transferred by the PDSCH that the PDCCH indicates. If the unique identifier of the UE is included in the data, the UE determines that the random access procedure has been normally performed, thus completing the random access procedure.

The above initial access procedure is described based on a single-carrier system. However, in a multi-carrier system environment, the above initial access procedure may be performed using at least one of a plurality of carriers, not using a single carrier. Accordingly, it is necessary to define how a UE obtains information regarding available carriers of a base station, a method of selecting one or more carriers from among available carriers of the base station in order to perform the initial access process, and how the base station determines which carriers are used for the UE to attempt to perform the initial access process.

Now, an efficient initial access method in a multi-carrier environment according to one embodiment of the present invention will be described.

Figure 11:
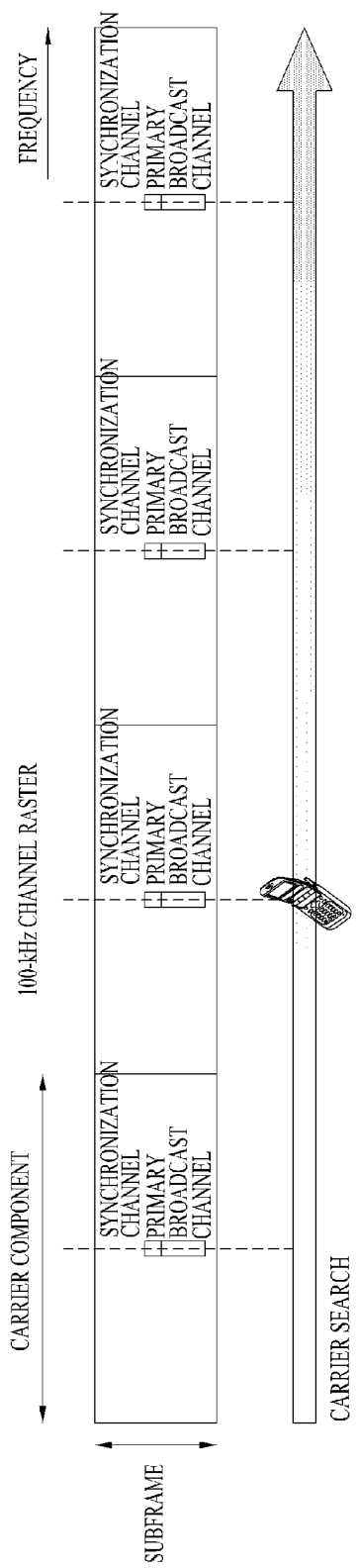
FIG. 11 is a diagram showing a method of transmitting a synchronization channel and a primary broadcast channel (PBCH) on a carrier basis according to one embodiment of the present invention.

FIG. 11 is a diagram showing a method of transmitting a synchronization channel and a primary broadcast channel (PBCH) on a carrier basis according to one embodiment of the present invention.

The method according to the present embodiment will be described on the assumption that the synchronization channel signal and the PBCH are present in all DL component carriers as shown in FIG. 11. In the present embodiment, fundamentally, physical cell identifiers (PCIs) notified through the synchronization channels transmitted in the DL component carriers are the same in multiple carriers within a single cell.

Hereinafter, the initial access method in the multi-carrier environment according to the present invention will be described.

Access Method

In an initial cell search procedure, a UE attempts to detect a synchronization channel signal in frequency raster units.

If the synchronization channel signal is successfully detected in an aggregated DL carrier, the carrier may be set to a DL reference carrier. In this procedure, a physical cell identifier is received. Even when a reference carrier is not separately set, hereinafter, for convenience, a DL carrier in which the synchronization channel signal is detected is referred to as a reference carrier.

A PBCH may be received from the reference carrier and information such as a DL transmission bandwidth, a physical hybrid automatic repeat request indicator channel (PHICH), a system frame number (SFN) and the number of transmission antennas of a base station may be received.

A UE receives system information SI-x transmitted through the reference carrier in order to acquire information necessary for initial access. The system information includes a UL bandwidth, a UL absolute radio frequency channel number (UL EARFCN), higher layer signaling associated with setting of several UL and DL channels, etc. That is, when the UE receives the system information so as to be aware of the UL radio frequency channel number and the bandwidth of the UL carrier, DL-UL pair band information is obtained in frequency division multiplexing.

The UE may set the UL carrier acquired using the above method to a UL reference carrier. As described above, in the present invention, even when a reference carrier is not separately set in UL, hereinafter, for convenience, a UL carrier linked with the DL carrier in which the synchronization channel signal is detected is referred to as a reference carrier.

A base station transmits cell-specific multi-carrier setting information through a DL reference carrier such that a UE is aware of carrier setting information of the cell. In this process, the same physical cell identifier may be transmitted through a synchronization channel signal of aggregated multiple DL carriers within one cell or different physical cell identifiers may be transmitted on a carrier basis. If the UE is aware of the carrier setting information of the cell, it is possible to change the carrier through a simple handover process.

The cell-specific multi-carrier setting information may be transmitted to the UE through extended system information SI-x for the UE which follows the LTE standard or through a reserved portion of the PBCH defined in the general LTE standard (LTE Rel.8). As another transmission method, the cell-specific multi-carrier setting information may be included in broadcast information or system information of the cell or the absolute radio frequency channel number.

The cell-specific multi-carrier setting information includes information indicating a DL carrier among multiple carriers of the cell, carrier frequency information, downlink/uplink carrier link information within the cell, etc.

If the physical cell identifiers of the multiple DL carriers within the same cell are the same, since DL carrier information within the cell acquired from the cell-specific multi-carrier setting information may be used, the UE may not receive a PBCH, system information and synchronization channel of another DL carrier.

On the contrary, if the physical cell identifiers of multiple DL carriers within the cell are different, the UE detects a synchronization channel in each of the DL carriers using DL carrier information acquired from the cell-specific multi-carrier setting information and receives the physical cell identifier of each carrier. The UE may use the received physical cell identifiers to generate and scramble a reference signal sequence on a carrier basis. Thereafter, the UE receives the PBCH and the system information so as to become aware of information regarding a UL carrier linked to each DL carrier.

In the case where link information of the DL/UL carrier within the cell is separately transmitted, the UE may become aware of the link information without system information.

Hereinafter, a random access procedure of a UE according to one embodiment of the present invention using information acquired using the above-described cell search method will be described.

Random Access Procedure

First, a UE may transmit a random access preamble (that is, Message 1) to a base station through a physical random access channel of an UL reference carrier using a physical random access channel parameter transmitted through a DL reference carrier. The base station transmits a random access channel response (Message 2) through the DL reference carrier when receiving the random access preamble.

The random access channel response transmitted from the base station to the UE may be transmitted using the following two methods, that is, Method 1 and Method 2. Messages 1 to 3 described in the following methods are similar to those described with reference to FIGS. 9 and 10 except for a portion associated with multiple carriers and the overlapping description thereof will be omitted for brevity.

Method 1

In a first random access channel response transmission method, a random access channel response is transmitted through all DL component carriers linked with a UL carrier through which a random access preamble is transmitted.

Figure 12:
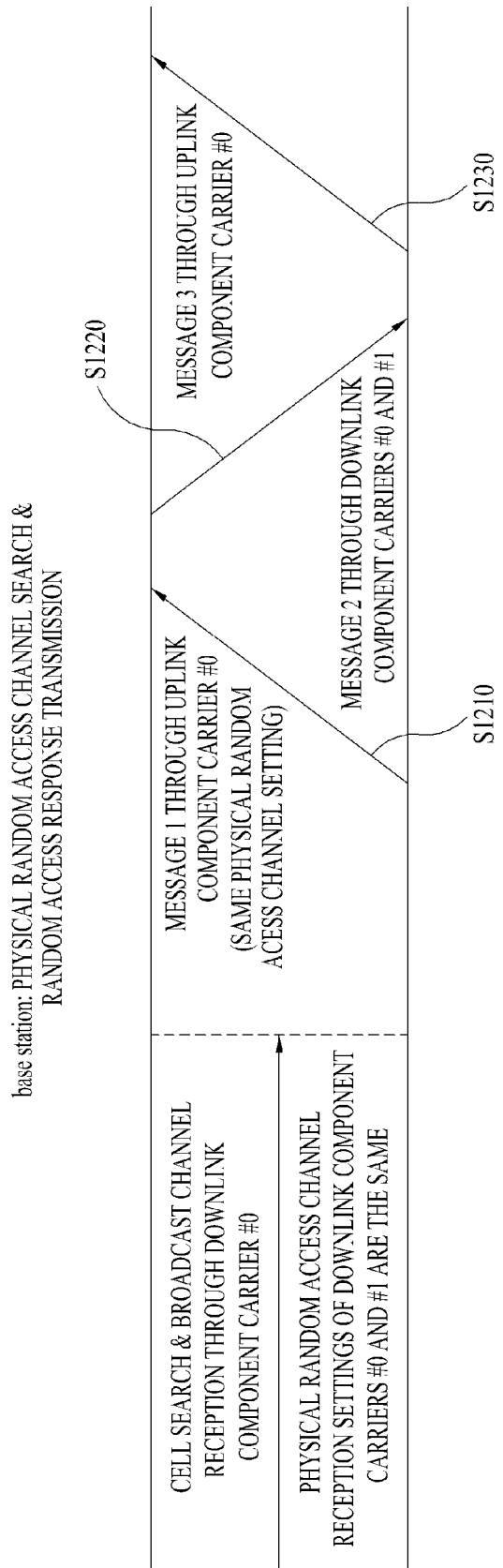
FIG. 12 is a diagram showing an example of a random access procedure of a UE in a multi-band system environment according to one embodiment of the present invention.

FIG. 12 is a diagram showing an example of a random access procedure of a UE in a multi-band system environment according to one embodiment of the present invention.

In FIG. 12, an asymmetric carrier (DL heavy) situation in which the number of DL component carriers is greater than the number of available UL component carriers of a UE is assumed. More specifically, it is assumed that the number of UL component carriers is 1 (UL component carrier #0) and the number of DL component carriers is 2 (DL component carriers #0 and #1).

It is assumed that all DL component carriers have the same physical random access channel setting (that is, the same random access preamble set) and cell search and broadcast channel reception through the DL reference carrier (that is, the downlink component carrier) are completed.

Referring to FIG. 12, the UE transmits a random access preamble through the physical random access channel of the UL component carrier #0 linked with the DL reference carrier searched by the UE (S1210).

At this time, the base station is not aware of through which DL component carrier the UE attempts to perform cell access using Message 1 transmitted from the UE, because the random access preamble sets of two DL component carriers are the same. Accordingly, the base station transmits Message 2 (that is, a random access channel response) to the UE through both of the DL component carriers (S1220).

The random access channel response may be transmitted through both the downlink component carriers linked with the UL reference component carrier at a certain time.

The base station may differently set information included in the random access channel response (that is, Message 2) on a DL component carrier basis. Examples of the random access channel response include a temporary cell identifier, a UL grant, etc. Therefore, the UE can determine which DL component carrier is searched in the cell search procedure. Information included in Message 3 transmitted after the UE receives the random access channel response is changed according to the DL component carrier received through Message 2. Accordingly, the base station can check through which DL component carrier the UE receives the broadcast channel in the cell search procedure.

Then, the UE may transmit Message 3 to the base station through the UL component carrier (S1230).

As another example of Method 1, a method of, at an base station, transmitting a random access channel response at different times on a DL component carrier basis may be used, which will be described with reference to FIG. 13.

Figure 13:
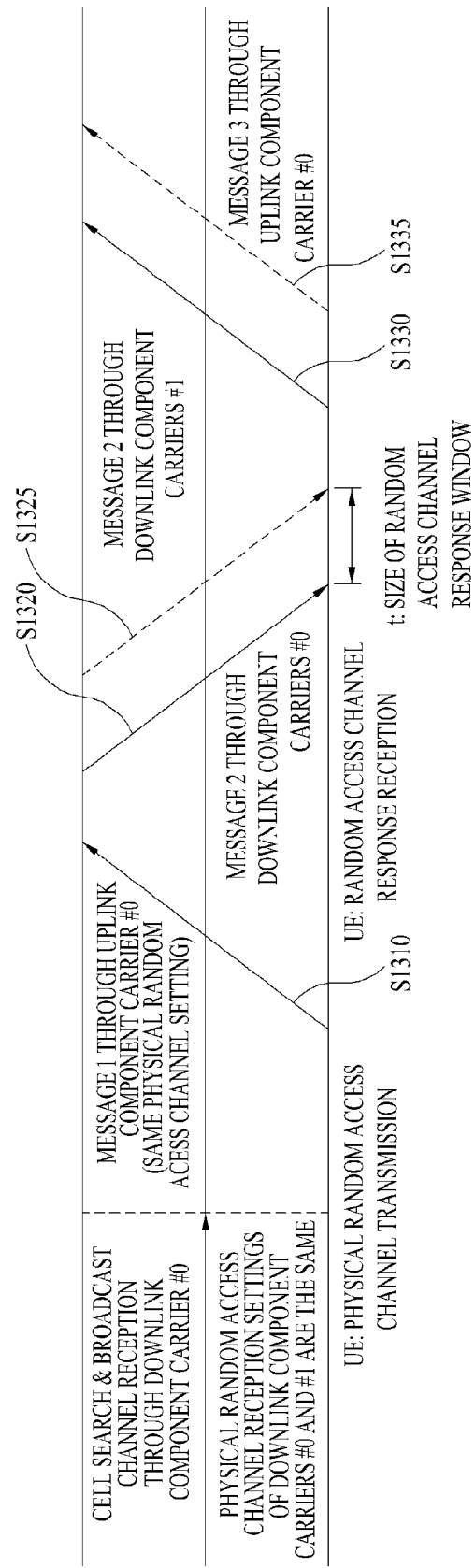
FIG. 13 is a diagram showing another example of a random access procedure of a UE in a multi-band system environment according to one embodiment of the present invention.

FIG. 13 is a diagram showing another example of a random access procedure of a UE in a multi-band system environment according to one embodiment of the present invention.

The assumption of FIG. 13 is similar to that of FIG. 12 and a description thereof will be omitted.

Referring to FIG. 13, the UE transmits a random access preamble through the physical random access channel of the UL component carrier #0 linked with the DL reference carrier searched by the UE (S1301).

In another example of Method 1, the base station receives the random access preamble from the UE and transmits a random access channel response to the UE through all the DL carriers linked with one UL carrier in response thereto, similar to the above-described example of Method 1. However, transmission timings of the random access channel response transmitted through the DL carriers are differently set on a DL carrier basis. At this time, a time interval between one DL carrier and another DL carrier may be called a random access channel response window and the size thereof is preferably a time corresponding to 2 to 10 subframes. If the UE receives the random access channel response through a specific DL carrier and transmits Message 3 to the base station, the base station can check through which DL carrier the UE attempts to perform initial access using reception timing of Message 3.

Referring to FIG. 13 again, the base station first transmits Message 2 to the UE through the DL component carrier #0 (S1320) and then transmits Message 2 to the UE through the DL component carrier #1 after the time corresponding to the random access channel response window has elapsed (S1325).

The UE may transmit Message 3 to the base station through the UL component carrier #0 in response to Message 2 received through the DL component carrier #0 (S1330).

If the UE detects the DL component carrier #1 upon initial cell search and attempts to perform initial access through the DL component carrier #1, the UE may receive Message 2 transmitted through the DL component carrier #1 in step S1325. The UE may transmit Message 3 to the base station in response thereto after the time corresponding to the random access channel response window has elapsed from step S1330 (S1335).

Accordingly, the base station may determine through which DL component carrier the UE attempts to perform initial access at a time when Message 3 is transmitted.

Next, Method 2 will be described.

Method 2

In a second random access channel response transmission method, a random access channel response is transmitted through a DL component carrier linked with a UL carrier through which a random access preamble is transmitted.

Figure 14:
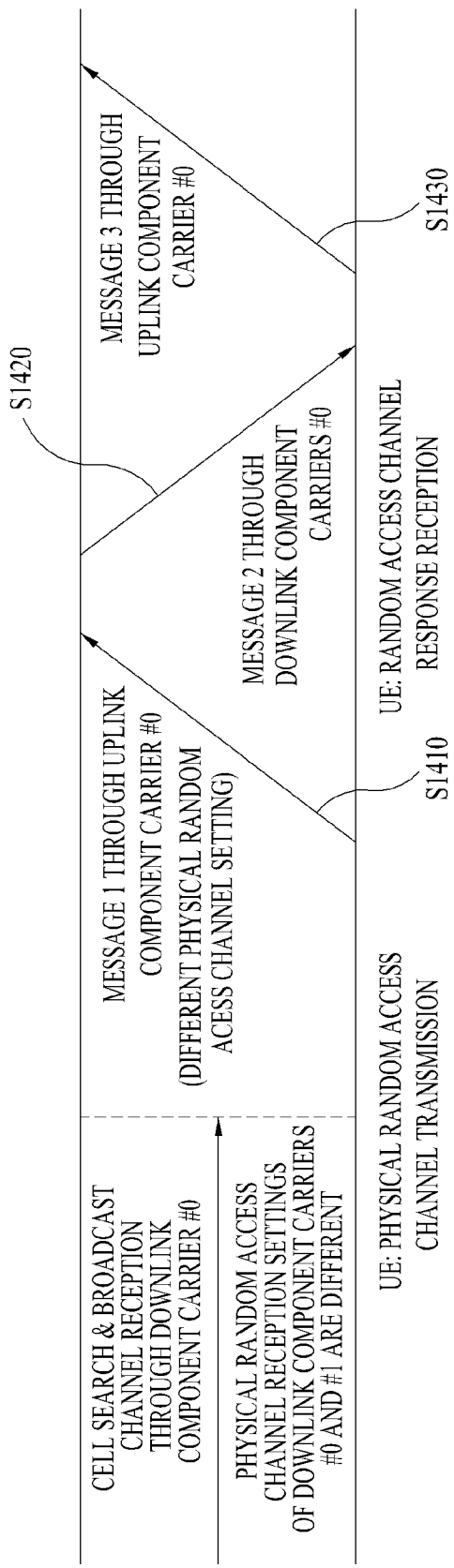
FIG. 14 is a diagram showing an example of a random access procedure of a UE in a multi-band system environment according to one embodiment of the present invention.

FIG. 14 is a diagram showing an example of a random access procedure of a UE in a multi-band system environment according to one embodiment of the present invention.

In FIG. 14, an asymmetric carrier (DL heavy) situation in which the number of DL component carriers is greater than the number of available UL component carriers of a UE is assumed. More specifically, it is assumed that the number of UL component carriers is 1 and the number of DL component carriers is 2. In the present embodiment, the DL component carriers have different physical random access channel setting (that is, different random access preamble sets).

The base station transmits different physical random access channel parameters defined as RRC Layer-1 parameters of a plurality of DL component carriers linked with one UL component carrier. In this case, the base station is aware of physical random access panel parameters transmitted to the UE through the broadcast channels of different DL carriers. Accordingly, even when the plurality of DL carriers is linked with one UL carrier, several base stations can determine through which DL component carriers the UE attempts to perform random access, by receiving the random access preamble from the UE.

Referring to FIG. 14, the UE selects any one of the random access preambles of a physical random access channel preamble set received through the DL component carrier #0 and transmits the physical random access channel of the UL component carrier #0 to the base station (S1410), after cell search and broadcast channel reception through the DL reference carrier (that is, the DL component carrier #0) are completed.

The base station can determine that the UE performs cell search and broadcast reception through the DL component carrier #0 using the random access preamble transmitted from the UE and thus may transmit Message 2 (random access channel response) through the DL component carrier #0 (S1420).

The UE may transmit Message 3 to the base station through the UL component carrier #0 in response to Message 2 (S1430).

This method is advantageous in view of blind decoding complexity of the UE and DL carrier resources can be efficiently used because the random access channel response is transmitted only through one DL carrier.

Next, a procedure after transmitting Message 3 will be described.

When the UE transmits Message 3 to the base station, the UE and the base station may perform a negotiation procedure according to UE capabilities. Then, the base station may assign UE-specific or UE-group-specific carrier aggregation information to the US.

Hereinafter, for convenience, assignment of the US-specific or US-group-specific carrier aggregation information is collectively referred to as "assignment of UE-specific carrier". The "UE-specific carrier assignment information" may include information regarding available candidate carriers used when the UE transmits or receives control information/data in a cell.

Such UE-specific carrier assignment information may be used when DL-UL linkage information of the system needs to be overridden in order to support a UE using asymmetric carrier aggregation within a cell although cell carriers are symmetrically set (that is, the number of UL component carriers and the number of DL component carriers are equal), which will be described with reference to FIG. 15.

Figure 15:
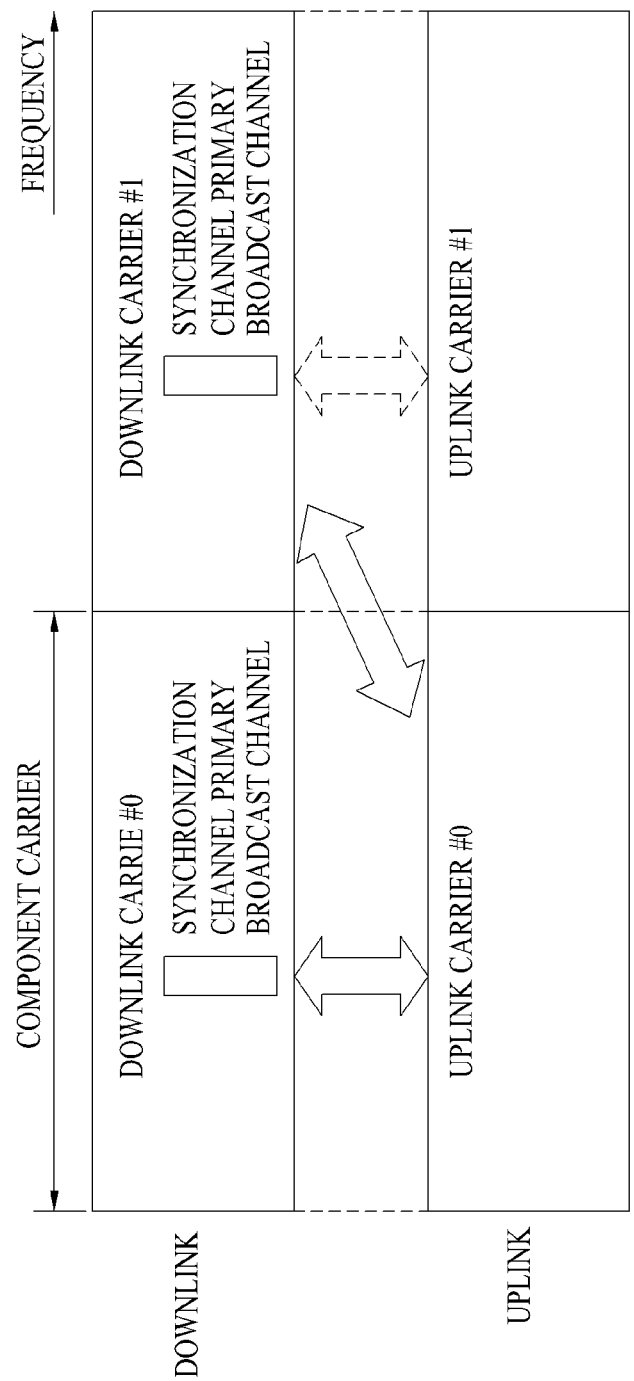
FIG. 15 is a diagram showing an example of a method of setting a carrier for a specific UE regardless of carrier setting of a cell using UE-specific carrier assignment information according to one embodiment of the present invention.

FIG. 15 is a diagram showing an example of a method of setting a carrier for a specific UE regardless of carrier setting of a cell using US-specific carrier assignment information according to one embodiment of the present invention.

The UE-specific carrier allocation information may be transmitted to only a UE or a UE group which should override the DL-UL linkage information of the system or may be transmitted to all UEs using carrier aggregation. In FIG. 15, a symmetric multi-carrier aggregation state having two DL component carriers and two UL component carriers as available candidate carriers is changed to an asymmetric multi-carrier aggregation state in which two DL component carriers are asymmetrically linked with one UL component carrier #0 through overriding.

In this state, if the UE does not detect its physical DL control channel when performing blind decoding with respect to the physical DL control channels in candidate DL component carriers available to the UE, the UE may not receive data through the carrier in the subframe.

In the case where the base station transmits the above-described UE-specific carrier assignment information to the UE according to one embodiment of the present invention, the UE-specific carrier assignment information may be used for the following purpose.

Since the UE-specific carrier assignment information does not need to be dynamically changed, the base station may notify the UE of the UE-specific carrier assignment information through UE-specific RRC signaling or transmit the UE-specific carrier assignment information to the UE using a separate channel with a specific period.

In the case where the base station semi-statically assigns information regarding candidate carriers to be used in a carrier aggregation environment to the UE through UE-specific RRC signaling, a probability that the UE does not use all the assigned candidate carriers may be very low. Therefore, L1 CA control information may be transmitted only in a specific situation requiring overriding (That is, event triggering).

The candidate carriers to be searched for by the UE may be dynamically limited according to UE traffic or cell traffic. In this case, in order to limit the search of the UE for at least one of the candidate carriers included in the UE-specific carrier assignment information, the base station may dynamically or semi-statically transmit linkage change information of the carriers to be searched for by the UE using L1/L2 control signaling.

When the base station transmits the linkage change information of the carriers included in the UE-specific carrier assignment information to the UE using L1/L2 control signaling, the base station may include valid time offset information of the linkage change information in the control signaling. By this method, the base station does not transmit the control signaling in every subframe and radio resources may be conserved.

The UE-specific carrier assignment information according to one embodiment of the present invention may be transmitted using the following method.

1) First, the base station may transmit information such as a DL carrier index or an extended DL EARFCN to the UE so as to provide only information regarding the DL carrier frequency number. In this case, the linkage information of the UL carrier may be transmitted through the system information of the carrier.

2) A specific UE which has symmetric cell carrier aggregation setting but has asymmetric carrier aggregation capabilities may require linkage change information so as to override the cell setting (The UE can become aware of the cell setting through the DL-UL linkage information transmitted through the system information within the cell).

3) Next, the UE-specific carrier assignment information may be transmitted to the UE in the form of information regarding DL carriers and linkage information of the DL carriers and the UL carriers.

Hereinafter, L1 carrier aggregation control information which is one form of UE-specific carrier assignment information according to one embodiment of the present invention will be described.

As described above, the basic UE-specific or UE-group-specific carrier assignment information may be semi-statically transmitted through the same method as UE-specific RRC signaling. Information for overriding the semi-statically transmitted UE-specific carrier assignment information, that is, the above-described linkage change information, is hereinafter referred to as "Layer-1 carrier assignment control information (L1 CA control)", for convenience. That is, L1 CA control information notifies a specific UE or UE group of a carrier aggregation state using a method of overriding RRC.

Such L1 CA control information may be used to dynamically manage carriers as compared to RRC.

The L1 CA control information may be dynamically transmitted in every subframe. In this case, transmission errors are rare even when a feedback (e.g., ACK/NACK) indicating whether or not the UE receives the L1 CA control information is not transmitted. Even when an error occurs in reception of the L1 CA control information transmitted in a certain subframe, the reception error of the L1 CA control information influences one subframe because new L1 CA control information is transmitted in the next subframe.

The L1 CA control information may be semi-statically transmitted to the UE. That is, the L1 CA control information may be transmitted with a period of two or more subframes and previously received L1 CA control information is used in the UE during the period. In this case, since the L1 CA control information is not transmitted in every subframe, it is possible to prevent DL resource waste. A reception error of the UE influences the subframe corresponding to one transmission period.

In the case where the L1 CA control information is semi-statically transmitted in order to solve this problem, it is possible to enable the UE to transmit feedback information indicating whether an error occurs upon reception of L1 CA control information to the base station. That is, the UE which receives the L1 CA control information may determine whether an error occurs using a cyclic redundancy check (CRC) method. The UE may transmit a feedback indicating the determined result in uplink after predetermined subframes has elapsed from the subframe in which the L1 CA control information is received.

A general LTE UE (LTE Rel.8) may transmit a feedback to a base station using a PUCCH format 1. Additional feedback may be transmitted in order to prevent an error from occurring in transmission of the feedback information. The feedback of the L1 CA control information may be CRC protection feedback information.

In one embodiment of the present invention, the following methods are proposed as the method of transmitting the L1 CA control information.

1) Transmission through PDCCH

The L1 CA control information is preferably transmitted through a PDCCH because it is information regarding management of carriers through which control information/data is received. Even in this case, a process of checking whether or not an error occurs in reception of the PDCCH using Layer-1 type or CRC protection feedback information is preferably performed.

In the case where the L1 CA control information is included in the PDCCH, a channel control element nCCE is maintained but is included in a common search space in a state in which the location thereof is restricted.

As another example, the L1 CA control information may be included only in a UE-specific search space in a state in which the location thereof is restricted, because the common search space is restricted. In particular, the location of the L1 CA control information is restricted to a specific location, that is, a first portion or a last portion, of the UE-specific search space. If the L1 CA control information is transmitted at this location, it is possible to minimize influence on the general LTE UE.

As another example, the L1 CA control information may be transmitted only through the PDCCH of a UE-specific/UE-group-specific primary carrier or an LTE-A dedicated carrier.

2) Transmission through dedicated channel

The L1 CA control information may be transmitted through a channel separately from the PDCCH, such as a physical control channel format indicator channel (PCFICH) defined in a general LTE (LTE Rel-8) system.

For example, there is a control channel element nCCE located next to a PDCCH region.

3) Transmission through PDCCH in a state of adding L1 CA control information to a DL control information (DCI) format without generating a separate channel The L1 CA control information may be included in the DCI format for an LTE-A UE. Since a general LTE UE is not influenced by the DCI format, no problem occurs in downlink compatibility.

In this method, the L1 CA control information may be transmitted within a PDCCH error range. Even when an error occurs, since the PDCCH is dynamically transmitted, no problem occurs in transmission.

Hereinafter, carrier aggregation according to another embodiment of the present invention will be described.

First, a method of transmitting carrier assignment information according to another embodiment of the present invention will be described.

The carrier assignment information may be transmitted through RRC signaling or may be set as a combination of a variety of control information. Information indicating whether or not each carrier is used may be set independently or together.

Information indicating whether or not a specific carrier is used may be transmitted to a UE through control signaling of an individual carrier. A carrier sleep function may be controlled through control signaling of an individual carrier. The carrier sleep function refers to a function for disabling a specific carrier among candidate carriers allocated through UE-specific RRC signaling during a restricted duration.

A carrier sleep command may be transmitted to a UE through a certain carrier. However, when the carrier sleep command is transmitted through a carrier to which a sleep function is applied, it is possible to reduce overhead while ensuring carrier independence. Although the carrier sleep command is preferably applied to a single carrier, information regarding multiple carriers may be simultaneously included in the carrier sleep command.

The carrier sleep command may be transmitted through the above-described L1 CA control information or a CRC protection message.

Both the UE and the base station may initiate the carrier sleep operation. The terminal does not process a carrier which is in a sleep state and can process the carrier again if the sleep duration of the carrier is finished.

Meanwhile, information transmitted through a PDCCH map while overriding RRC layer setting may be associated with carrier sleep (only k (k≤n) carriers of the semi-statically assigned n carriers are used during t1 (t1≤T, T=RRC transmission duration).

The UE does not perform buffering with respect to a carrier which is in a carrier sleep state during a specific duration. Since buffering and blind decoding are not performed under the control of the system during the specific duration, this method is advantageous in view of UE reception complexity and power conservation.

As another embodiment of the present invention, a UE and a base station in which the embodiments of the present invention are implemented will be described.

The UE serves as a transmitter in uplink and serves as a receiver in downlink. The base station serves as a receiver in uplink and serves as a transmitter in downlink. That is, each of the UE and the base station may include a transmitter and a receiver for information or data transmission.

The transmitter and the receiver may include a processor, a module, a part and/or means for implementing the embodiments of the present invention. In particular, the transmitter and the receiver may include modules (means) for encrypting a message, modules for analyzing an encrypted message and antennas for transmitting and receiving a message. The example of the transmitter and the receiver will be described with reference to FIG. 16.

Figure 16:
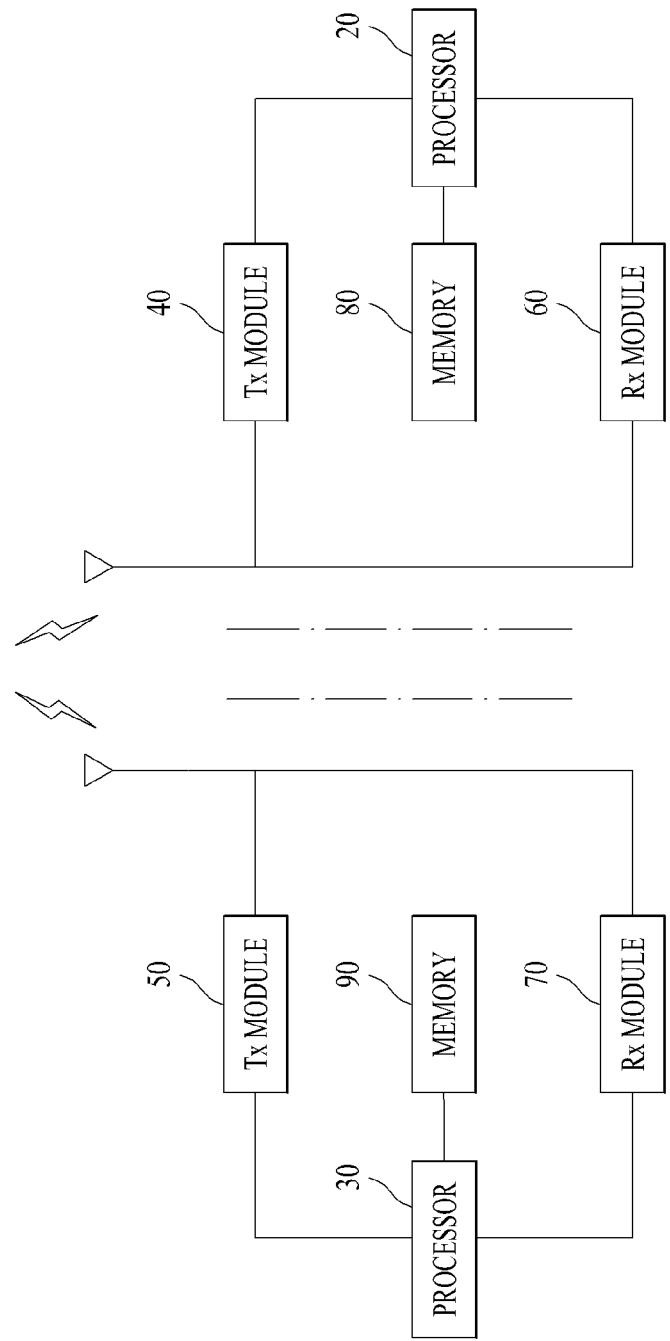
FIG. 16 is a block diagram showing an example of the configuration of a transmitter and a receiver, in which the embodiments of the present invention are implemented, according to another embodiment of the present invention.

FIG. 16 is a diagram showing the configuration of a transmitter and a receiver, in which the above-described embodiments of the present invention can be implemented, as another embodiment of the present invention.

The left side of FIG. 16 shows the structure of the transmitter and the right side thereof shows the structure of the receiver. The transmitter and the receiver include antennas 5 and 10, processors 20 and 30, transmission (Tx) modules 40 and 50, reception (Rx) modules 60 and 70, and memories 80 and 90, respectively. The components may perform respective functions. Hereinafter, the components will be described in greater detail.

The antennas 5 and 10 serve to transmit the signals generated by the Tx modules 40 and 50 to external devices or to receive RF signals from external devices and deliver the signals to the Rx modules 60 and 70. If a Multiple Input Multiple Output (MIMO) function is supported, two or more antennas may be included.

The processors 20 and 30 control the overall operations of the transmitter and the receiver. In particular, the processor may perform a controller function for implementing the embodiments of the present invention, a MAC frame variable controller function according to service characteristics and propagation environments, a handover function, an authentication and encryption function, etc.

In particular, the processor of a mobile terminal may control the operation of the terminal required for an initial access procedure in a multi-band environment described in the embodiments of the present invention and exchange data with a base station or a relay node.

For example, the processor may control the Rx module to receive a broadcast channel of one or more DL component carriers and system information from the base station or the relay node, set a DL reference component carrier, and detect UL component carriers linked with the DL reference component carrier. Then, the processor may select one random access channel preamble from a random access channel preamble set indicated by the physical random access channel parameter of the broadcast channel and control the Tx module to transmit the selected random access channel preamble to the base station through UL component carriers.

The processor may receive UE-specific/UE-group-specific carrier assignment information so as to determine its available carriers and receive L1 CA control information so as to perform communication with the base station through the changed carrier regardless of the carrier assignment information.

The processor of the base station may determine DL component carriers through which the UE attempts to perform initial access according to the content and/or reception timing of Message 1 to Message 3 transmitted from the UE. The processor of the base station may transmit UE-specific/UE-group-specific carrier assignment information to the UE so as to provide available carrier information and transmit the L1 CA control information to the UE through dedicated signaling in order to support an asymmetric carrier environment of an LTE-A UE regardless of the carrier assignment information.

The Tx modules 40 and 50 may perform predetermined coding and modulation with respect to data which are scheduled by the processors 20 and 30 and are transmitted to the external devices, and send the signals and/or data to the antenna 10.

The Rx modules 60 and 70 may perform decoding and demodulation with respect to the RF signals received through the antenna 5 and 10, restore the signals to original data, and send the signals to the processors 20 and 30.

The memories 80 and 90 may store programs for processing and control of the processors and perform a function for temporarily storing input/output data (in case of the UE, the carrier assignment information allocated by the base station, a temporary cell identifier, L1 CA control information, etc.). In addition, the memories 80 and 90 may include at least one storage medium such as a flash memory type, hard disk type, multimedia card micro type and card type memory (e.g., an SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disc. The above-described Rx module, Tx module and antenna are collectively referred to as an RF module.

The base station may perform a controller function for performing the embodiments of the present invention, an orthogonal frequency division multiple access (OFDMA) packet scheduling, frequency division duplex (TDD) packet scheduling and channel multiplexing function, a handover function, an authentication and encryption function, a packet modulation/demodulation function for data transmission, a high-speed packet channel coding function and a real-time model control function using at least one of the above-described modules or further include separate means, modules or portions for performing such functions.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

[Industrial Applicability]

Although an initial random access method in a multi-band environment and the structure of a terminal therefor are described as applied to a 3GPP LTE system, they are applicable to various mobile communication systems having a multi-band environment in addition to the 3GPP LTE system.

What is claimed is:

1. A method for controlling one or more carriers in a multi-carrier aggregation condition in a wireless communication system, the method performed by a mobile terminal and comprising:
- transmitting a message for requesting a random access procedure to a base station;
- performing a negotiation procedure with the base station in response to the message according to a capability to support symmetric carrier aggregation including an equal number of uplink and downlink component carriers and asymmetric carrier aggregation including an unequal number of uplink and downlink component carriers of the mobile terminal;
- receiving carrier assignment information regarding the one or more component carriers assigned to the mobile terminal for communication with the base station through Radio Resource Control (RRC) signaling based on the negotiation,
- wherein the carrier assignment information is used to override downlink-uplink linkage information to support the mobile terminal using asymmetric carrier aggregation within a cell although cell carriers are set according to a symmetric carrier aggregation;
- receiving carrier control information and time offset information from the base station using L1/L2 control signaling; and
- performing deactivation of one component carrier among the assigned one or more component carriers of the symmetric carrier aggregation based on the received carrier control information, after expiration of a period indicated in the time offset information
- wherein the carrier assignment information is valid until a start of the performing of the deactivation of the one component carrier;
- wherein the downlink-uplink linkage information defines how the downlink component carriers are linked with the uplink component carriers.

2. The method according to claim 1, wherein the carrier control information is semi-statically transmitted from the base station when a predetermined event triggers.

3. The method according to claim 1, wherein the carrier control information is transmitted from the base station using a separate channel with a predetermined period.

4. The method according to claim 1, further comprising;
- transmitting feedback information indicating whether an error occurs upon reception of the carrier control information to the base station,
- wherein the feedback information is protected by a cyclic redundancy check (CRC).

5. An apparatus for controlling one or more component carriers in a multi-carrier aggregation condition in a wireless communication system, the apparatus comprising:
- a radio frequency (RF) unit; and
- a processor configured to:
    - transmit a message for requesting a random access procedure to a base station,
    - perform a negotiation procedure with the base station in response to the message according to a capability to support symmetric carrier aggregation including an equal number of uplink and downlink component carriers and asymmetric carrier aggregation including an unequal number of uplink and downlink component carriers of the apparatus,
    - receive carrier assignment information regarding the one or more component carriers assigned to the apparatus for communication with the base station through Radio Resource Control (RRC) signaling based on the negotiation,
    - wherein the carrier assignment information is used to override downlink-uplink linkage information to support the apparatus using asymmetric carrier aggregation within a cell although cell carriers are set according to a symmetric carrier aggregation,
    - receive carrier control information and time offset information from the base station using L1/L2 control signaling, and
    - perform deactivation of one component carrier among the assigned one or more component carriers of the symmetric carrier aggregation based on the received carrier control information, after expiration of a period indicated in the time offset information,
    - wherein the carrier assignment information is valid until a start of the performing of the deactivation of the one component carrier, and
    - wherein the downlink-uplink linkage information defines how the downlink component carriers are linked with the uplink component carriers.

6. The apparatus according to claim 5, wherein the carrier control information is semi-statically transmitted from the base station when a predetermined event triggers.

7. The apparatus according to claim 5, wherein the carrier control information is transmitted from the base station using a separate channel with a predetermined period.

8. The apparatus according to claim 5, wherein the processor is configured to transmit feedback information indicating whether an error occurs upon reception of the carrier control information to the base station, and
- wherein the feedback information is protected by a cyclic redundancy check (CRC).

* * * * *